(12) United States Patent
Afzali-Ardakani et al.

(10) Patent No.: US 7,771,695 B2
(45) Date of Patent: Aug. 10, 2010

(54) COMPLEXES OF CARBON NANOTUBES AND FULLERENES WITH MOLECULAR-CLIPS AND USE THEREOF

(75) Inventors: Ali Afzali-Ardakani, Ossining, NY (US); Cherie R. Kagan, Ossining, NY (US); Rudolf Tromp, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 999 days.

(21) Appl. No.: 11/490,248

(22) Filed: Jul. 21, 2006

(65) Prior Publication Data

US 2010/0170418 A1 Jul. 8, 2010

(51) Int. Cl.
C07D 487/00 (2006.01)
C07D 209/02 (2006.01)
C07D 315/00 (2006.01)
C07D 317/70 (2006.01)
C07D 317/44 (2006.01)
D01F 9/12 (2006.01)
C09C 1/56 (2006.01)

(52) U.S. Cl. .................... 423/447.1; 548/417; 548/460; 423/447.4; 423/460; 977/840; 977/842; 977/895; 977/896

(58) Field of Classification Search ....................... None
See application file for complete search history.

(56) References Cited

U.S. PATENT DOCUMENTS

2006/0115640 A1\* 6/2006 Yodh et al. .................. 428/221

OTHER PUBLICATIONS

Satake et al.; Dynamic Supramolecular Porphyrin Systems; Tetrahedron; 61, 13-41; 2005.\*
Wu et al.; Hydrogen-Bonding-Driven Preorganized Porphyrin Receptors for Efficient Complexation of C, C, and C Derivatives; Journal of the American Chemical Society; 127, 49, pp. 17460-17468; Nov. 2005.\*
Boese et al.; Synthesis and Supramolecular.Structures of Molecular Clips; Tetrahedron ; 57, 3673-3687; 2001.\*

\* cited by examiner

*Primary Examiner*—Melvin C Mayes
*Assistant Examiner*—Guinever S Gregorio
(74) *Attorney, Agent, or Firm*—Connolly Bove Lodge & Hutz LLP; Vazken Alexanian

(57) ABSTRACT

Separation of carbon nanotubes or fullerenes according to diameter through non-covalent pi-pi interaction with molecular clips is provided. Molecular clips are prepared by Diels-Alder reaction of polyacenes with a variety of dienophiles. The pi-pi complexes of carbon nanotrubes with molecular clips are also used for selective placement of carbon nanotubes and fullerenes on substrates.

17 Claims, 10 Drawing Sheets

2a

2b

2c

2a

2b

2c where and  = nanotube

COMPLEXES OF CARBON NANOTUBES AND FULLERENES WITH MOLECULAR-CLIPS AND USE THEREOF

BACKGROUND

1. Technical Field

The present disclosure relates to complexes of carbon nanotubes or fullerenes with molecular clips containing aromatic side arms. This disclosure also relates to stabilized solutions of these complexes in aqueous or organic solvents. This disclosure is also concerned with the use of these complexes for separation of carbon nanotubes and fullerenes according to their diameters and self assembly of these complexes on particular metal or metal oxide surfaces. This disclosure also relates to use of molecular clips —CNT complexes for selective placement of carbon nanotubes and fullerenes.

2. Background Art

Carbon nanotubes (CNT) are semiconducting or metallic materials that can be used as the 'channel' material in field-effect transistors (FETs). One of the most common methods of fabricating CNT FETs starts with depositing nanotubes on an oxide thin film from a liquid suspension. Source and drain contacts are then formed lithographically on the nanotube. The oxide layer is the gate dielectric, and the highly doped bulk Si substrate back-gates the device. A schematic of a CNT FET is shown in FIG. 1. The deposition of CNTs on an oxide surface, followed by lithographic patterning of source and drain contacts, has been successfully used in construction of single CNT field-effect transistors (or mats of CNTs).

The first requirement for solution deposition of carbon nanotubes is a stable solution of carbon nanotubes in an organic solvent or an aqueous solution thereof. There have been many examples of dispersions of carbon nanotubes in aqueous solution using an organic soap, e.g. sodium dodecylsulfonate, in water. Although highly stable solutions of carbon nanotubes in aqueous sodium dodecylsulfonate (DSD) have been reported, the presence of the sodium salt in any electronic device results in adverse electrical effects that is detrimental to device performance.

Other methods of forming stable dispersions of carbon nanotube have been through functionalization of CNTs with long chain organic compounds through carbon-carbon bond formation with a substituted aryldiazonium salt. Functionalization of CNTs via carbon-carbon bond formation destroys the conjugated structure of CNTs and resulting in CNT devices that show significant scattering of electrical charge. These CNTs can not be used as a semiconductor or a metal unless the organic decontamination is removed at very high temperature (500-600° C.).

Another challenge facing the application of CNTs in electronic applications is heterogeneity in CNT diameters and hence in the band gap of seminconducting CNTs in samples prepared by known methods. For electronic applications it is mostly desirable to use CNTs with a narrow distribution in size (diameter) to obtain devices with reproducible electronic properties.

SUMMARY

The present disclosure addresses problems encountered in prior techniques for the functionalization, dispersion, separation and placement of CNTs. In particular, one aspect of the present disclosure relates to pi-pi complexes of carbon nanotubes (CNTs) and fullerenes with Diels-Alder adducts of polyacenes and dienophiles herein referred to as molecular clips.

Complexes of CNTs and fullerenes according to the present disclosure are capable of forming stable dispersions of CNTs and fullerenes in aqueous or an organic solvents. Suitable organic solvents include chloroform, benzene, toluene, xylenes, dichlorobenzene, N,N-dimethylformamide, propyleneglycol and methyl ether acetate.

One aspect of this disclosure is the separation of carbon nanotubes or fullerenes according to size (diameter) by complexation of the CNTs or fullerenes with molecular clips, and the formation of stable solution of the complexes.

Another aspect of this disclosure relates to depositing a dispersion of a complex of a CNT- or fullerene with molecular clips onto a substrate such as an oxide or metal oxide, metal or semiconductor surface to form a monolayer of CNTs or fullerenes on the substrate.

The present disclosure also relates to an article comprising a substrate and a layer of a complex the CNT- or fullerene-molecular clips disclosed above.

A still further aspect of this disclosure relates to fabricating an article which comprises depositing on a substrate a layer of a guest-host complex disclosed hereinabove.

Another aspect of this disclosure is concerned with selectively placing a complex disclosed hereinabove onto a substrate.

A further aspect of this disclosure is concerned with fabricating an electronic device which comprises selectively depositing a CNT-molecular clip complex disclosed above onto a substrate and then depositing electrical contacts. A typical example being a FET. Inversely, an aspect of this disclosure is concerned with fabricating an electronic device which comprises depositing onto a substrate with electrical contacts CNT-molecular clip complexes, an example also being a FET.

Other objections and advantages of the present disclosure will become readily apparent to those skilled in this art from the following detailed description, wherein it is shown and described only the preferred embodiments, simply by way of illustration of the best mode contemplated of carrying out the disclosure. As will be realized, the disclosure is capable of other and different embodiments, and its several details are capable of modifications in various obvious respects, without departing from the disclosure. Accordingly, the description is to be regarded as illustrative in nature and not as restrictive.

BEST AND VARIOUS MODES

Figure 1:
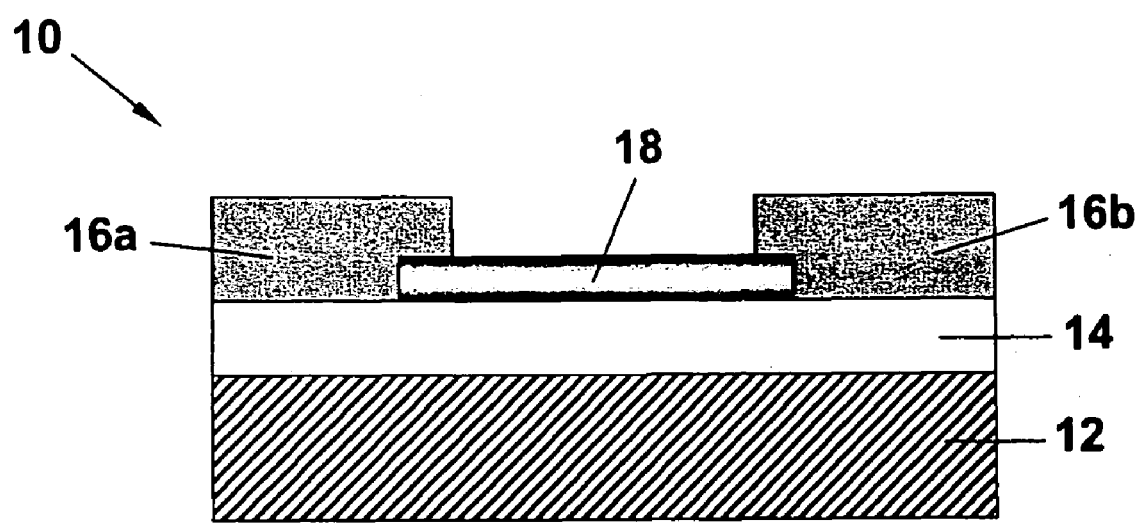
FIG. 1 is a schematic layout of a back-gated carbon nanotube field-effect transistor.
Figure 2:
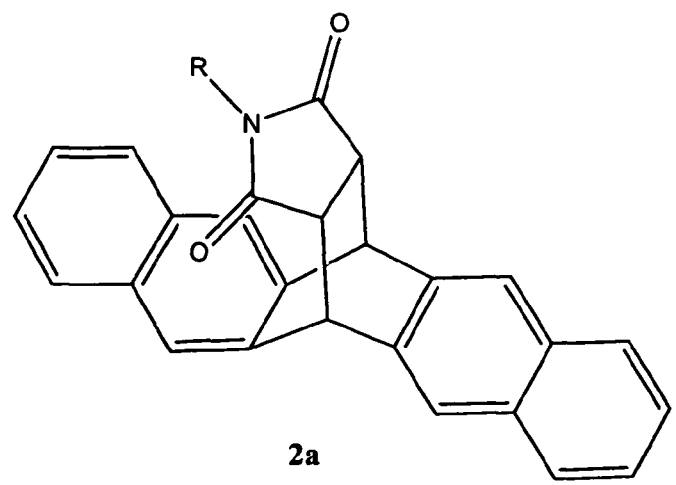
FIG. 2 is an example of a Diels-Alder adduct of pentacene that can be used as a molecular clip for formation of a pi-pi complex with a carbon nanotube or a fullerene according to this disclosure.
Figure 2:
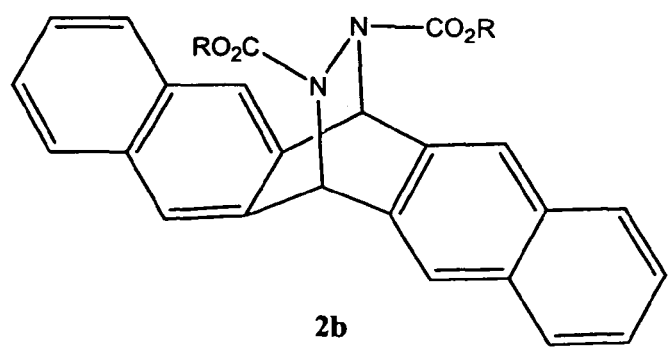
Figure 2:
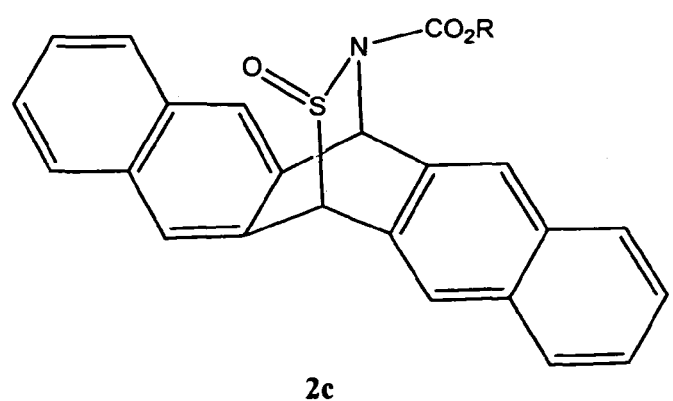

The present disclosure provides pi-pi complexes of molecular clips with carbon nanotubes (CNTs) and fullerenes. The present disclosure also provides a method for preparing stable dispersions of CNTs in a solvent by complexation with soluble molecular clips. The present disclosure also provides a method of separation for carbon nanotubes or fullerenes according to size using said stable dispersions of CNTs or fullerenes in a solvent In particular, this disclosure provides pi-pi complexes of CNTs and molecular clips containing polyacene side arms with 1-3 aromatic rings. Examples of suitable polyacenes are represented by the following structures:

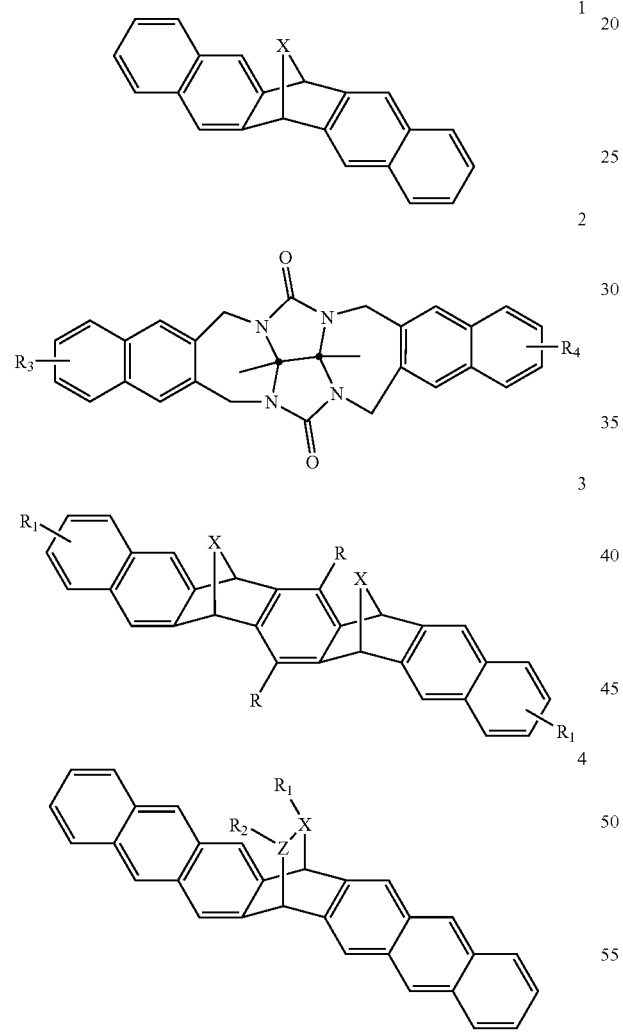

The common feature among structures 1-4 are that all molecules are "V" shaped with a dihedral angle ranging from 100-125° and contain aromatic rings in their two side arms. The distance between end-rings of the two side arms range from 0.5 to 2.0 nm depending on the number of the aromatic rings in each side arm. The presence of the aromatic rings in these molecules makes it possible for these compounds to form pi-pi complexes with carbon nanotubes and fullerenes and therefore act as a molecular clip. As an example, the molecular clip presented in general formula 4 is easily prepared by Diels-Alder reaction of polyacenes with dienophiles. Polyacenes used for preparation of molecular clips depicted in structure 4 are chosen from anthracene 5, tetracene 6, pentacene 7, dibenzoanthracene 8, hexacene 9, and heptacene 10.

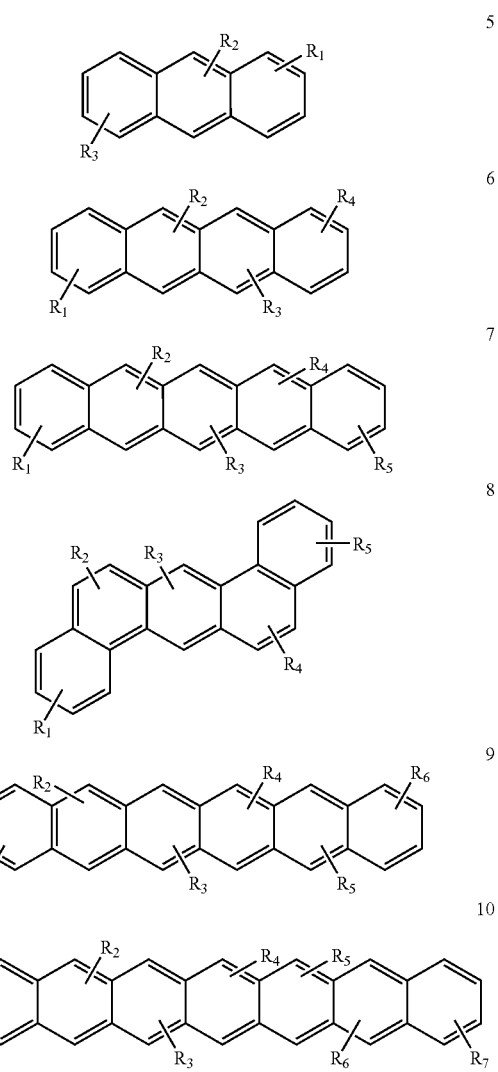

Further examples of molecular clips are polyacenes of the above compounds 5-10 wherein each terminal ring of the above compounds can also contain from one to two nitrogen atoms as depicted in compounds 11-14.

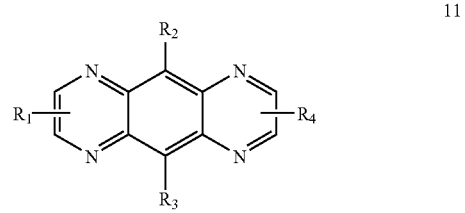

-continued

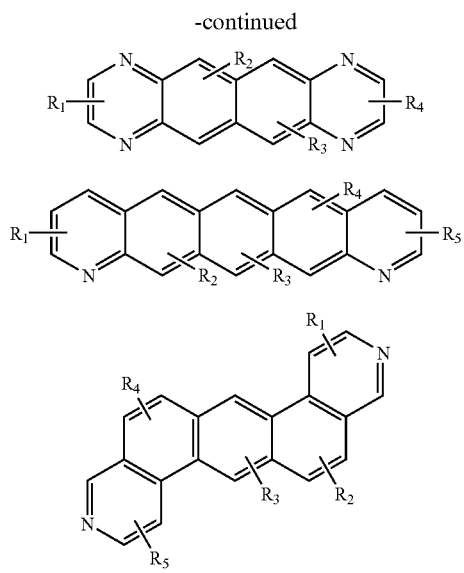

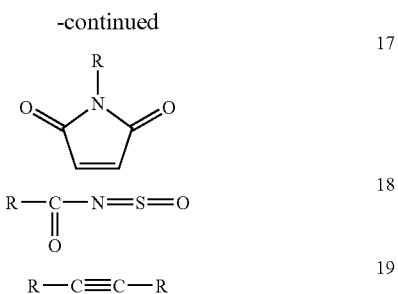

but not restricted to the above compounds. Diels-Alder reaction of any of the dienophiles 15-19 with any of the polyacenes 5-14 results in compounds with the general formula 20 below of: where X and Z are independently selected from CH or a hetero atom of O, N or S; m and n each independently could range from 0 to 3 and R and R' are either a cycloaliphatic ring or alkyl chain from 1-12 carbon atoms, and the terminal rings may contain from 1 to 2 N atoms.

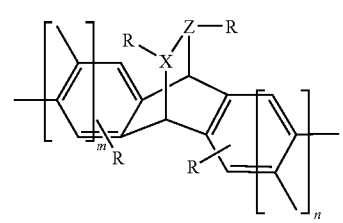

Each of $R_1$, $R_2$, $R_3$, $R_4$, $R_5$, and $R_6$ is individually selected from the group consisting of hydrogen, alkyl, silanyl, halo and alkoxy.

The term "alkyl" refers to straight or branched chain unsubstituted hydrocarbon groups of 1 to 22 carbon atoms, more typically 1 to 12 carbon atoms, and even more typically 1 to 4 carbon atoms.

The term "halogen" or "halo" refers to fluorine, chlorine, bromine and iodine.

The alkoxy groups typically contain oxygen and 1 to 22 carbon atoms, more typically contain 1-12 carbon atoms and even more typically contain 1-4 carbon atoms.

Examples of alkyl groups include methyl, ethyl and propyl. Examples of branched alkyl groups include isopropyl and t-butyl.

Examples of alkoxy groups include methoxy, ethoxy and propoxy.

The term "cycloalkyl" or "cycloaliphatic" refers to optionally substituted, saturated cyclic hydrocarbon ring systems, typically containing 1 to 3 rings and 3 to 7 carbons per ring which may be further fused with an unsaturated $C_3$-$C_7$ carbocyclic ring. Exemplary groups include cyclopropyl, cyclobutyl, cyclopentyl, cyclohexy, cycloheptyl, cyclooctyl, cyclodecyl, cyclododecyl and adamantyl.

In order to form a "molecular clip", the polyacenes are converted to their Diels-Alder adducts by reaction with a variety of dienophiles. Suitable dienophiles for this disclosure are selected from the following structures.

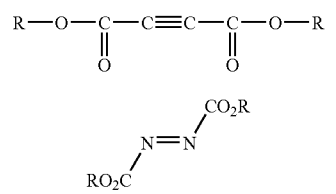

Another class of molecular clips used in this invention are based on compounds of structure 3 which have been previously reported (Kaerner, Frank Gerrit et al., Chemistry-A European Journal, 2005, 11, 3363) to form guest-host structures through charge transfer with electron deficient compounds. R and R1 are selected independently from H or alkyl groups of from 1-12 carbon atoms, alkoxy group of 1-12 carbon atoms and X is selected from O, S, NH, —NR group. Yet another class of molecular clips are presented by compound 2 where a glycouril moiety is attached to aromatic side arms on both side to form a cage-like structure. (R. J. M. Nolte et al., J. Am. Chem. Soc., 1993, 115, 8999.)

The Diels-Alder adducts of the polyacenes can include a second functional group capable of self-assembly on a substrate such as an oxide, metal oxide, metal or semiconductor surface. A particular example being a Diels-Alder adduct of pentacene and substituted maleimide as shown in compound 21.

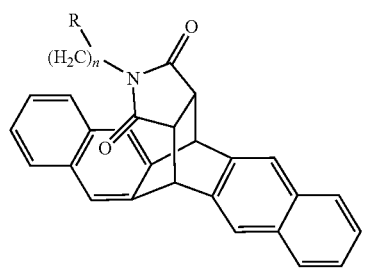

The Diels-Alder adducts employed in this disclosure can be referred to, for convenience, as "molecular clips" and can be synthesized by the process disclosed in US patent application publication 2003/0144562 A1 to Afzali-Ardakami et al. and assigned to International Business Machines Corporation, the assignee of this application, the entire disclosure of which is incorporated herein by reference.

Figure 5:
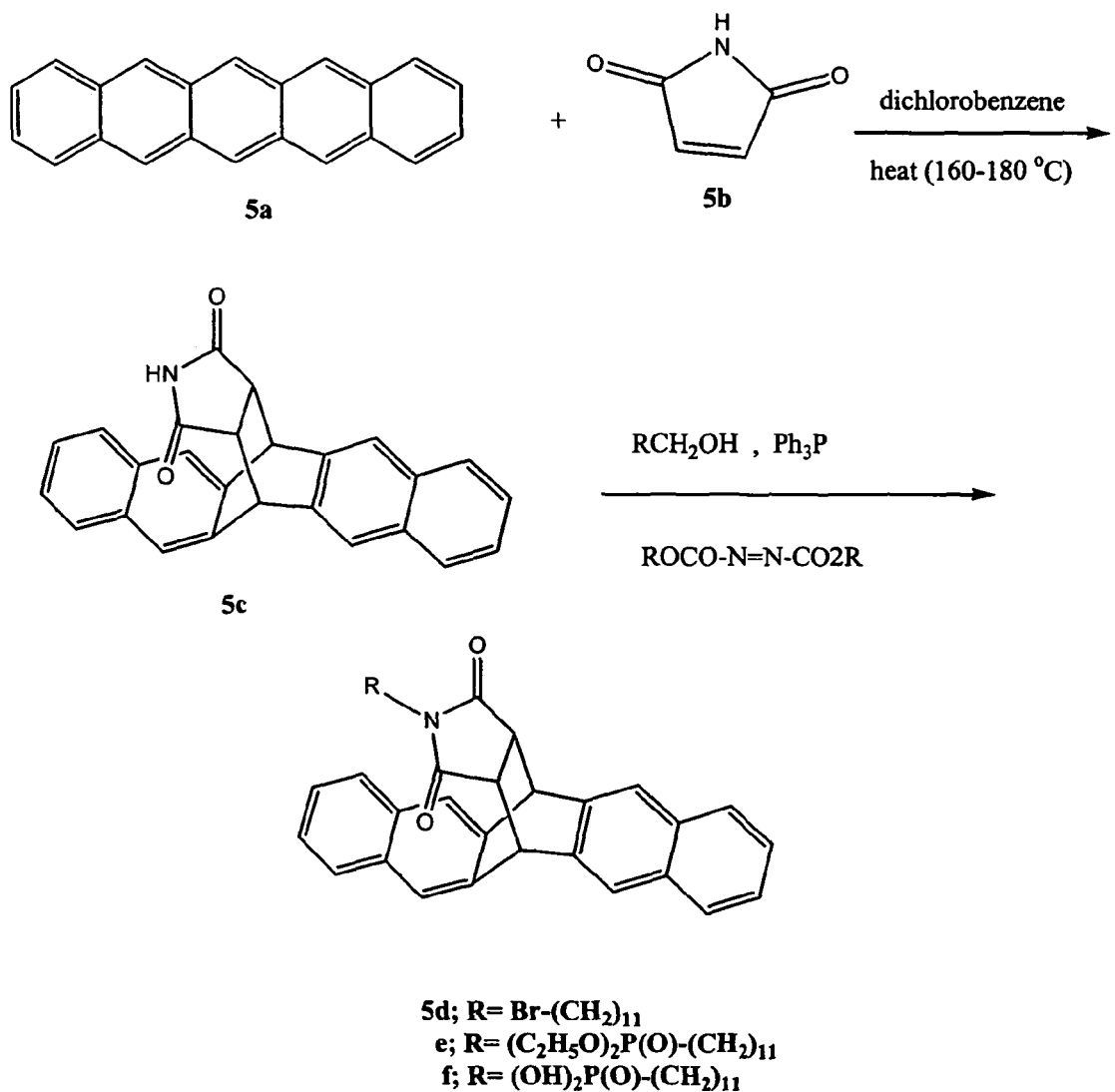
FIG. 5 is a synthetic scheme for preparation of N-alkylated maleimide-pentacene adduct.
Figure 6:
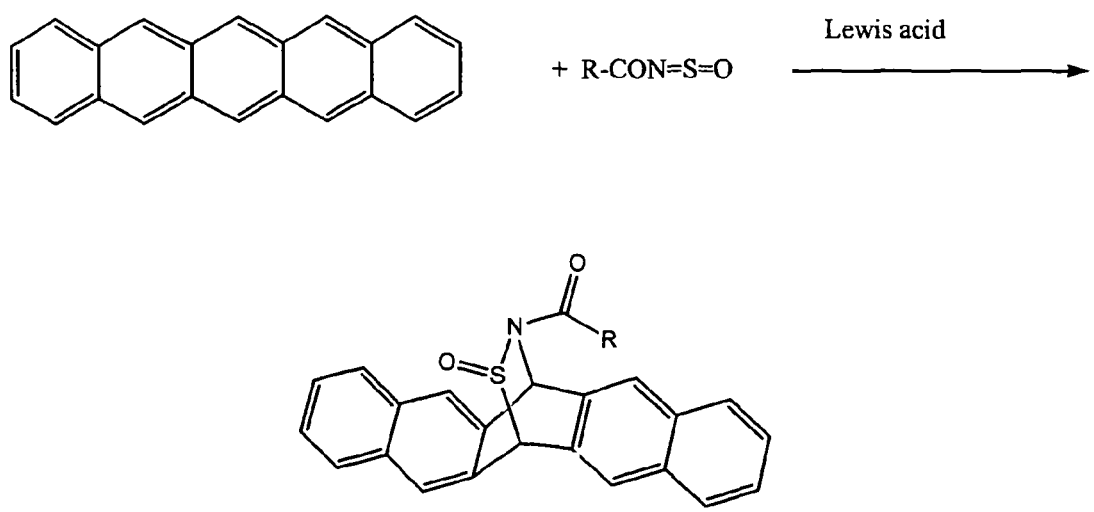
FIGS. 6 and 7 are synthetic schemes for preparation Diels-Alder adducts employed in the present disclosure.
Figure 7:
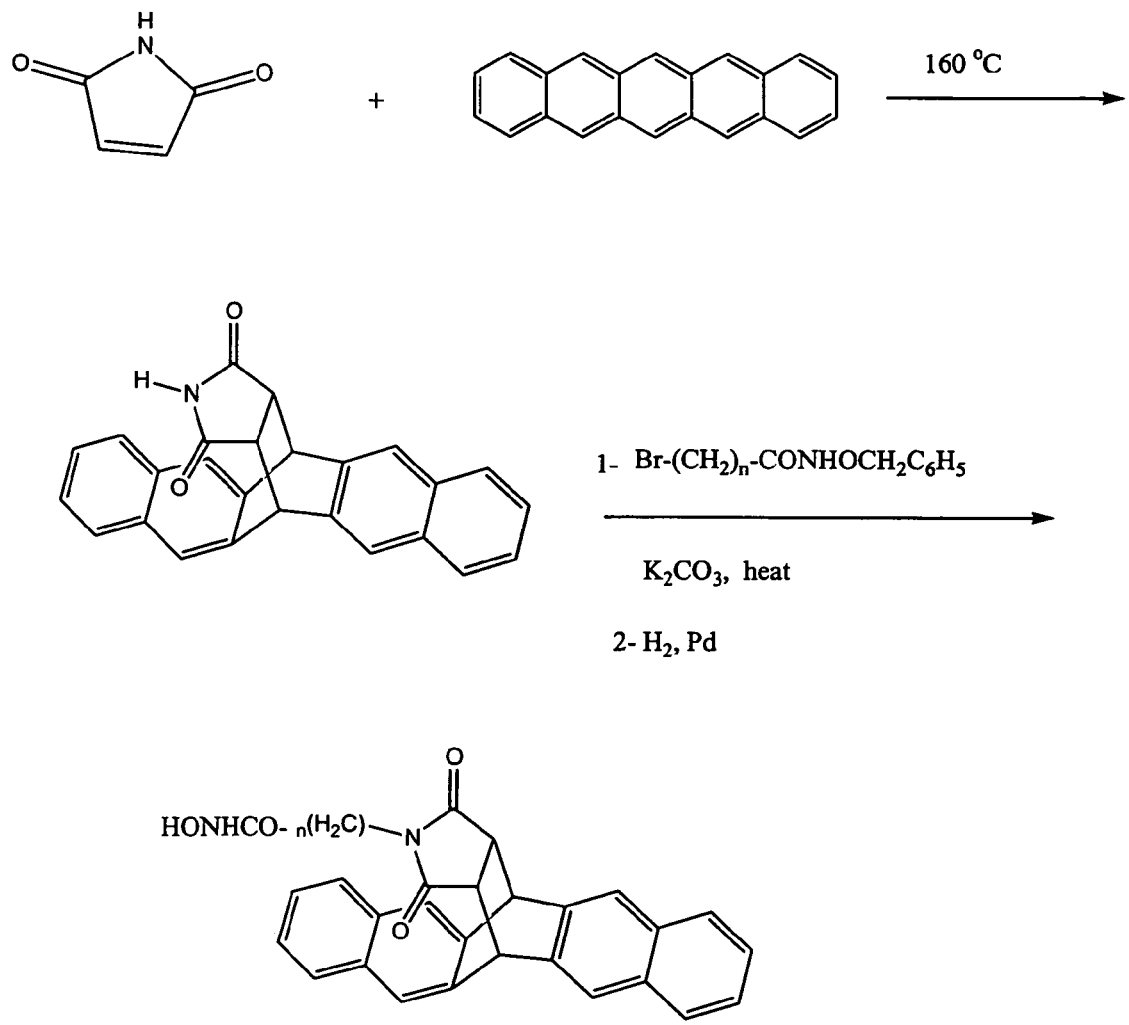

As an example of a molecular clip, FIG. 5 shows a synthetic scheme for the preparation of N-alkylated maleimide-pentacene adduct. In this scheme, in the first step pentacene is reacted with maleimide in a high boiling solvent such as dichlorobenzene, xylenes, N,N-dimethylformamide, N,N-dimethylacetamide, etc. at high temperature (160-180° C.). The adduct is then reacted with a long chain alcohol in the presence of triphenylphosphine and diethyl azodicarboxylate in a Mitsunobu reaction to form the alkylated adduct. In another example (see FIG. 6), pentacene is reacted with N-sulfinylamide in the presence of a Lewis acid catalyst to form an adduct which is soluble in organic solvents and is capable of clamping on to CNTs. Preparation of molecular clamps with additional functionality for selective placement is depicted in the synthetic scheme shown in FIG. 7.

The Diels-Alder adducts typically have a structure in which the aromatic ring attached to the bicyclic middle ring forms a dihedral angle of about 120°. Depending on the particular polyacene and dienophile used in this invention, the distance between the outer rings increases as the number of rings in polyacene increases. This in turn would change the extent of the overlap between the adduct and carbon nanotubes or fullerenes of differing diameter. For example, the anthracene-maleimide adduct 22 has a dihedral angle of about 120° and the distance between the outer rings is about 0.5 nm whereas in pentacene-maleimide adduct 23, the dihedral angle is again about 120° but the distance between the outer rings increases to about 1.0 nm. Therefore, compound 22 has a better chance of significant overlap with small diameter (0.4-0.7 nm) CNTs and adduct 23 can form pi-pi overlap with larger diameter (ca.1-1.3 nm) CNTs.

Figure 3:
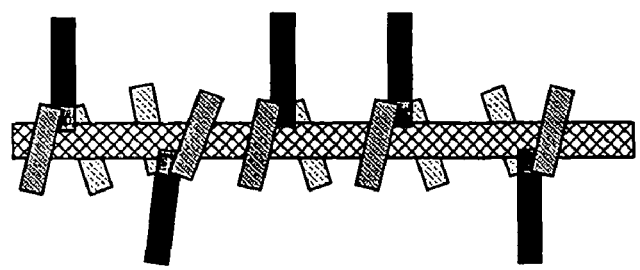
FIG. 3 is a schematic of a pi-pi complex of a Diels-Alder adduct of a polyacene with a carbon nanotube or a fullerene.
Figure 3:
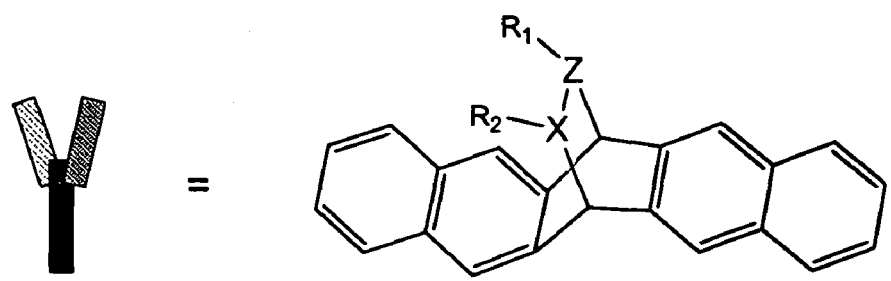
Figure 3:

Diels Alder adducts employed in the present disclosure have a three dimensional structure with pi orbitals in at least two (e.g. compound 22) aromatic rings that help to act as a molecular clip (See FIG. 3) for holding a nanotube or fullerene with diameters ranging from about 0.5 to about 2.5 nanometers and more typically about 0.5 to about 1.6 nanometers by pi overlap with the CNT or fullerene. Thereby, the adducts change the solubility parameters from those nanotubes or fullerenes which have not formed pi-pi overlap with molecular clips. This change of solubility is used to separate carbon nanotubes or fullerenes of different diameters.

22

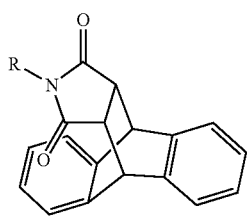

23

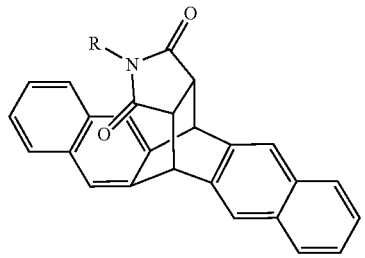

Therefore, another aspect of this disclosure provides a method for size-selective separation of carbon nanotubes according to CNT diameter. For this purpose, carbon nanotube powder is added to a solution of these adducts in organic solvents or water and the mixture is sonicated for a few hours during which time a portion of nanotube sample with certain diameters is clamped by the adduct through pi-pi overlap and is dispersed in solution. Nanotubes which have not been clamped by the adduct settle out from the solvent and can be separated from the solution by decantation. The weight ratio of the nanotube to the adduct is typically about 1:1 to about 1:100 and more typically about 1:2 to about 1:20. In a typical example about 5 mg of nanotube powder is employed with about 50 to about 60 mg of the adduct.

Figure 4:
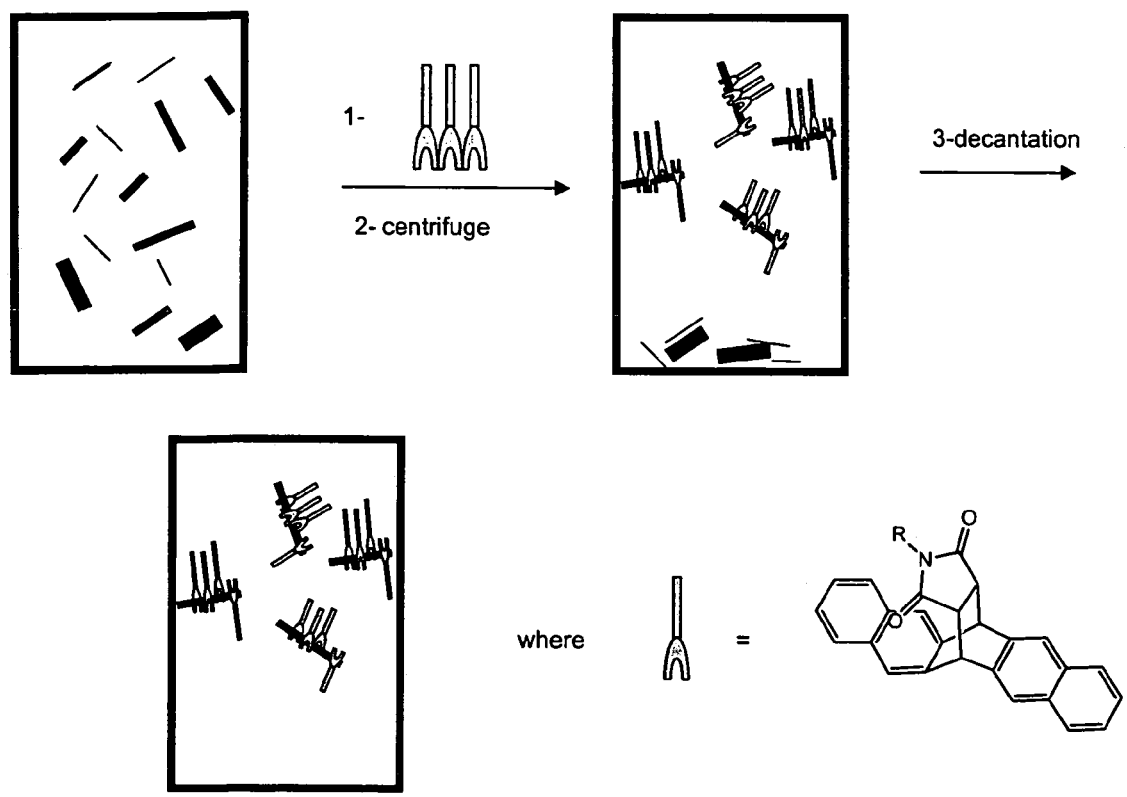
FIG. 4 is a schematic for the preparation of a stable solution of CNT-DA adduct complex and the size selective separation of carbon nanotube using polyacene Diels-Alder (DA) adducts as molecular clips.

By way of example, for formation of stable dispersions and size-selective separation, carbon nanotubes are added to a solution of the pentacene adduct shown in FIG. 5 and sonicated for a few hours. A portion of the carbon nanotubes having diameters that have sufficient pi-pi interaction with the adduct are dispersed in the solvent and the remainder of CNTs settle down after centrifugation as shown in FIG. 4.

Figure 8:
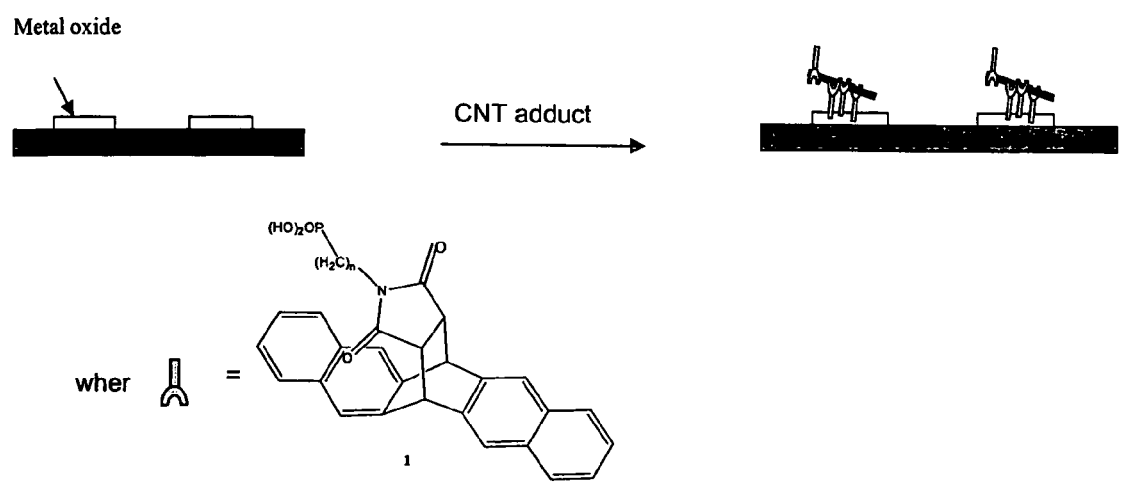
FIGS. 8 and 9 are schematic diagrams of selective placement of CNT-adduct complex on a metal oxide surface.
Figure 9:
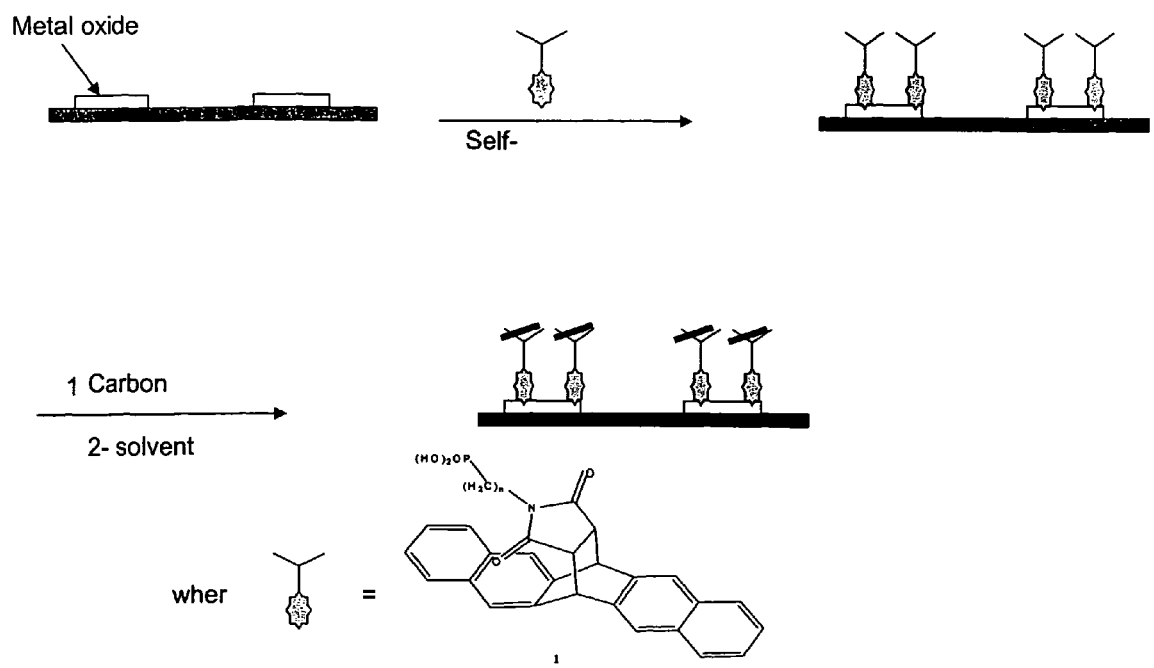

Another aspect of this disclosure is selective placement of CNTs on metals, semiconductor, or metal oxide surfaces. Selective placement of carbon nanotubes may be achieved through covalent functionalization of CNTs with organic compounds having at least one end group comprising of —SH, —NC, —PO$_3$H$_2$, —CONHOH or —CO$_2$H. (Selective placement of carbon nanotubes through functionalization; Afzali-Ardakani et al, Patent application YOR920050585US1) have been reported. In this invention the covalently functionalized CNTs of the prior art is replaced by CNT-molecular clip which are bound together by pi-pi overlap. For this purpose, the compounds of general formula 21 are selected form adducts which contain at least one thiol (—SH) or isocyanide (—NC) (R=—SH or —NC) functionality for placement on metal (Au, Pd, Pt, Cu etc) or semiconductor (GaAs, Si, CdSe, etc) surfaces or organic acid functionality of —CO$_2$H, —CONHOH or —PO(OH)$_2$ for placement on metal oxides such as aluminum oxide, hafnium oxide, or titanium oxide surfaces. For example see FIG. 7. In this approach, CNTs are dispersed in a solution of the adduct such as compound 21 and sonicated until part of the CNTs with appropriate diameter are clamped by the adducts. The mixture is then centrifuged to separate the portion of CNTs which have not been clamped and therefore come out of the solution. The supernatant liquid is then used for selective placement of the CNTs on for instance, a metal oxide surface. FIGS. 8 and 9 show the schematic of selective placement of CNT-Adduct complexes on metal oxide surface. The process involves immersing a substrate with a patterned metal oxide surface in the solution and after some time, typically about 10 minutes to about 24 hours removing and washing with solvent. In this process, carbon nanotubes are complexed by the adduct for an appropriate length of time, washed with solvent and dried whereupon the nanotubes complexed to the adduct selectively assemble on the metal oxide regions.

In yet another approach for selective placement of carbon nanotube or fullerenes, the molecular clip with end group functionality is deposited from an organic solvent on a particular surface (metals or metal oxide depending on the nature of the functionality) to form a monolayer of the adduct on the surface and then the substrate is immersed in a dispersion of CNT or fullerene in a liquid. In this approach, CNTs or fullerenes of particular diameter are anchored to the molecular clip and the rest can be washed away form the surface.

The following non-limiting examples are presented to further illustrate the present disclosure.

Example 1

Pentacene-Maleimide adduct (5c): A suspension of pentacene (287 mg, 1 mmole) and maleimide (1 mmole) in 4 mL of dichlorobenzene is heated to 160° C. for 4 hours. The mixture is cooled to room temperature and the precipitate is filtered, washed with toluene and dried. Recrystallization from dichlorobenzene affords pure samples of pentacene-maleimide adduct as white needles.

N-(11-bromoundecyl) maleimide-pentacene adduct (5d): Pentacene-maleimide adduct (5c) (375 mg, 1 mmole) are added to a solution of triphenyl phosphine (393 mg, 1.5 mmole) and 11-bromo-1-undecanol (375 mg, 1.5 mmole) in 40 mL of anhydrous tetrahydrofuran. To this mixture a solution of diisopropyl azodicarboxylate (300 mg, 1.5 mmole) in 10 mL of anhydrous THF is added dropwise under a stream of nitrogen. After completion of the addition, the solution is stirred at room temperature for 18 hours. The solvent is evaporated under reduced pressure and the residue is titrated with diethyl ether and the precipitate is filtered, washed with 1:1 ether-hexane and dried. Crystallization from benzene affords the pure sample of 11-bromoundecylmaleimide-pentacene adduct 5d.

Example 2

Figure 10:
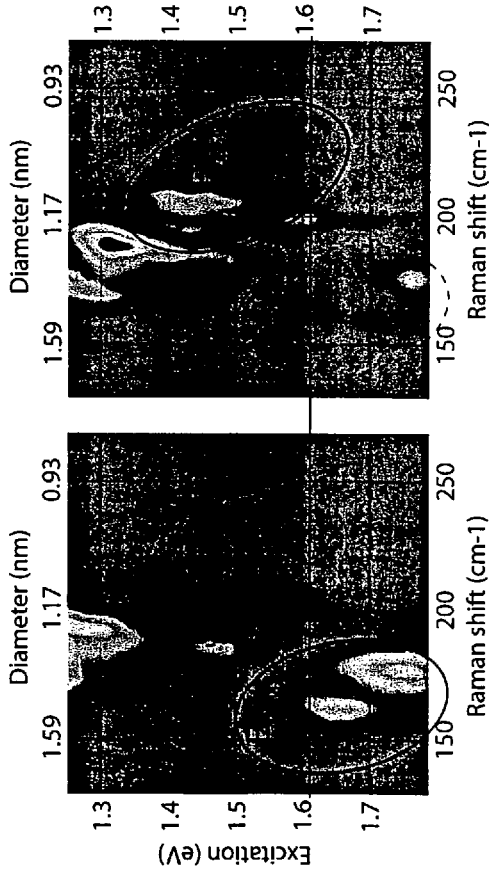
FIG. 10 shows a Raman spectra of CNT's in a supernatant liquid.
Figure 10:
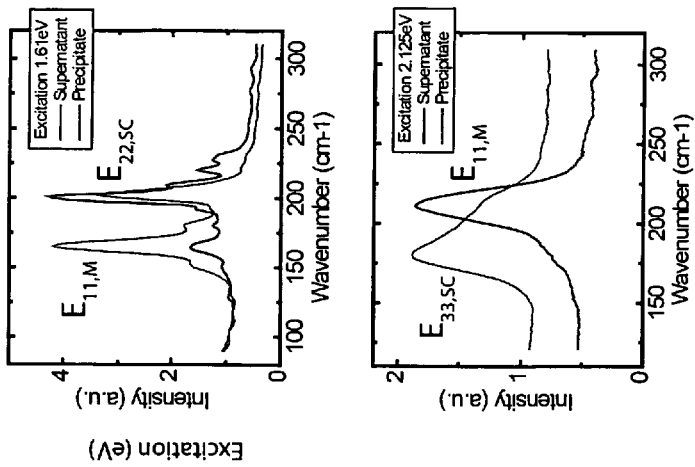

Separation of nanotubes according to size. To a solution of the adduct 5d (60 mg) in 15 mL of chloroform is suspended 2.5 mg of carbon nanotubes and the mixture is sonicated for 90 minutes. After sonication, the mixture is centrifuged for 30 minutes and the dark solution is decanted cautiously from the residue. Raman spectroscopy of the CNTs in the supernatant liquid shows that most of the nanotubes with diameters greater than 1.3 nm are separated and have precipitated out of the solution during centrifuge. See FIG. 10.

Example 3

Adduct 5f: Pentacene-N-alkylmaleimide adduct 5d (500 mg) is added to 5 mL of triethyl phosphate and the solution is heated under nitrogen at 160° C. for 4 hours. The solution is cooled to room temperature and excess triethyl phosphate is evaporated under reduced pressure to give phosphonate 5e which is dissolved in 10 mL of anhydrous dichloromethane and treated with 4 mmole of bromotrimethylsilane under nitrogen. The solution is stirred at room temperature for 4 hours and quenched with methanol and one drop of concentrated hydrochloric acid. The precipitate is removed by filtration and washed several times with methanol and then ether and dried to give phosphonic acid containing adduct 5f.

The term "comprising" (and its grammatical variations) as used herein is used in the inclusive sense of "having" or "including" and not in the exclusive sense of "consisting only of". The terms "a" and "the" as used herein are understood to encompass the plural as well as the singular.

The foregoing description illustrates and describes the present disclosure. Additionally, the disclosure shows and describes only the preferred embodiments of the disclosure, but, as mentioned above, it is to be understood that it is capable of changes or modifications within the scope of the concept as expressed herein, commensurate with the above teachings and/or skill or knowledge of the relevant art. The embodiments described hereinabove are further intended to explain best modes known of practicing the invention and to enable others skilled in the art to utilize the disclosure in such, or other, embodiments and with the various modifications required by the particular applications or uses disclosed herein. Accordingly, the description is not intended to limit the invention to the form disclosed herein. Also, it is intended that the appended claims be construed to include alternative embodiments.

All publications, patents and patent applications cited in this specification are herein incorporated by reference, and for any and all purposes, as if each individual publication, patent or patent application were specifically and individually indicates to be incorporated by reference. In the case of inconsistencies, the present disclosure will prevail.

What is claimed is:

1. A pi-pi complex of a carbon nanotube with a molecular clip or of a fullerene with a molecular clip,
   wherein the molecular clip is a Diels-Alder adduct of a polyacene with a dienophile.

2. The complex of claim 1 being a complex of a carbon nanotube.

3. The complex of claim 1 wherein the polyacene is selected from the group consisting of:

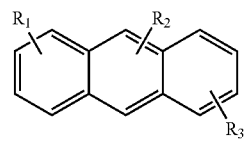

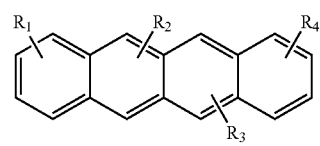

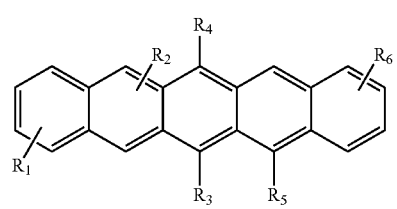

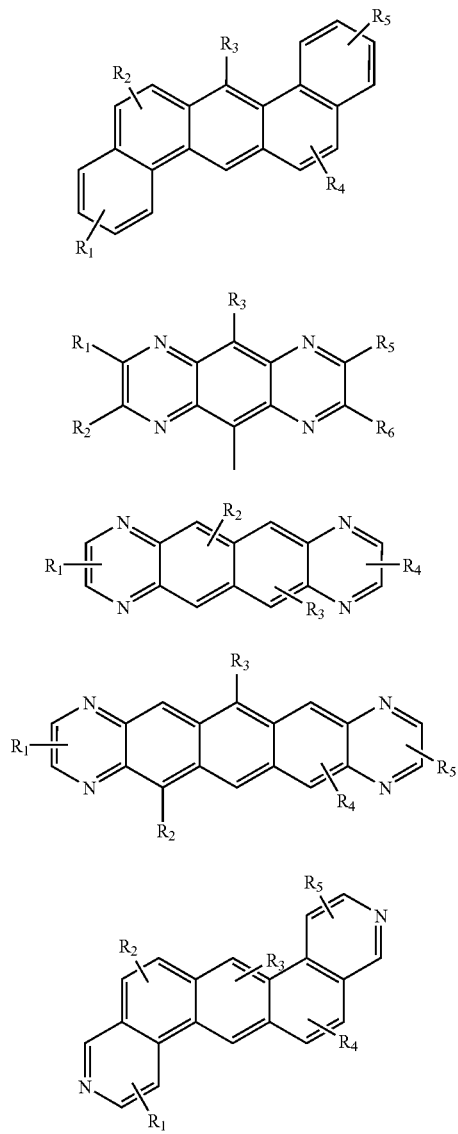

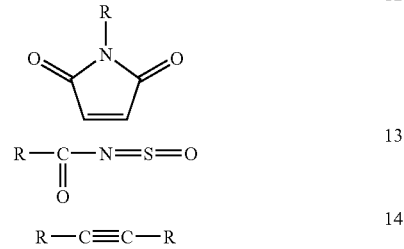

wherein each R and $R^1$ is a cycloaliphatic ring or an alkyl group.

6. The complex of claim 1 wherein the adduct is a Diels-Alder adduct of pentacene and maleimide.

7. The complex of claim 1, wherein the molar ratio of the nanotube or fullerene to adduct is about 1:1 to about 1:1000.

8. The complex of claim 1, wherein the carbon nanotube or fullerene has a diameter of about 0.5 to about 2.5 nanometers.

9. A dispersion of the complex according to claim 1 in water or an organic solvent.

10. The dispersion according to claim 9 wherein the organic solvent is selected from the group consisting of chloroform, benzene, toluene, xylenes, dichlorobenzene, N,N-dimethylformamide, propyleneglycol and methyl ether acetate.

11. The dispersion of claim 9 being a complex of a carbon nanotube.

12. The dispersion of claim 10 wherein the polyacene is selected from the group consisting of:

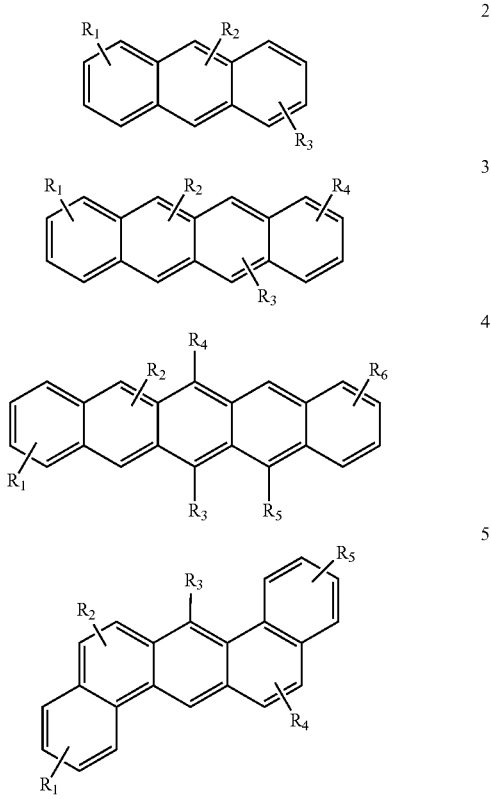

wherein each of $R_1$, $R_2$, $R_3$, $R_4$, $R_5$ and $R_6$ is individually selected from the group consisting of hydrogen, alkyl, silanyl, halo and alkoxy.

4. The complex of claim 1 wherein the polyacene is selected from the group consisting of anthracene, naphthacene, pentacene, hexacene and heptacene.

5. The complex of claim 1 wherein the dienophile is selected from the group consisting of

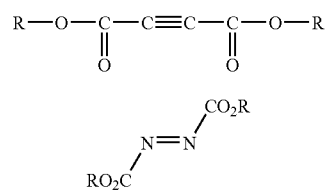

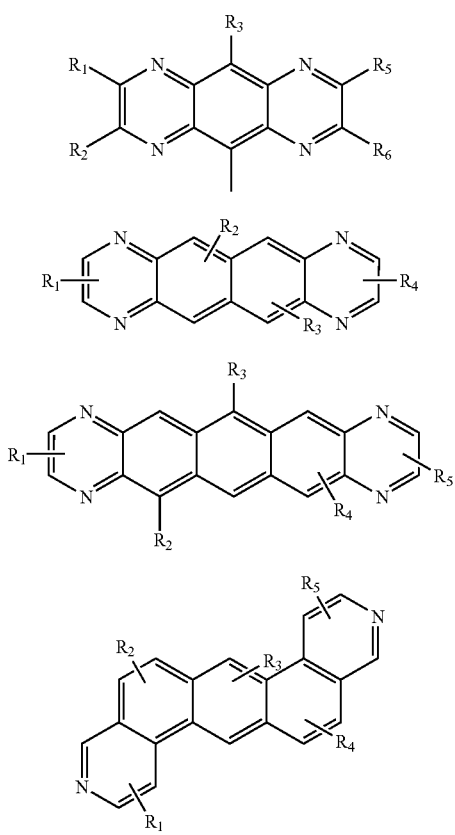

wherein each of $R_1$, $R_2$, $R_3$, $R_4$, $R_5$ and $R_6$ is individually selected from the group consisting of hydrogen, alkyl, silanyl, halo and alkoxy.

13. The dispersion of claim 9 wherein the polyacene is selected from the group consisting of anthracene, naphthacene, pentacene, hexacene and heptacene.

14. The dispersion of claim 9 wherein the dienophile is selected from the group consisting of

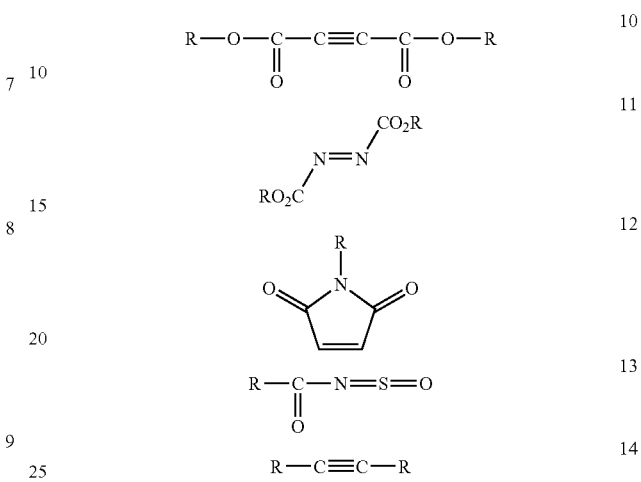

wherein each R and $R^1$ is a cycloaliphatic ring or an alkyl group.

15. The dispersion of claim 9 wherein the adduct is a Diels-Alder adduct of pentacene and maleimide.

16. The dispersion of claim 9 wherein the weight ratio of the nanotube or fullerene to adduct is about 1:1 to about 1:100.

17. The dispersion of claim 9 wherein the nanotube or fullerene has a diameter of about 0.5 to about 2.5 nanometers.

* * * * *